March 26, 1963

H. C. HANSEN 3,083,022

CENTER SPINDLES FOR MAGAZINE PHONOGRAPHS

Filed Aug. 8, 1956

2 Sheets-Sheet 1

INVENTOR.
HANS CHRISTIAN HANSEN

BY *Dicke & Craig*

ATTORNEYS.

March 26, 1963 H. C. HANSEN 3,083,022
CENTER SPINDLES FOR MAGAZINE PHONOGRAPHS
Filed Aug. 8, 1956 2 Sheets-Sheet 2
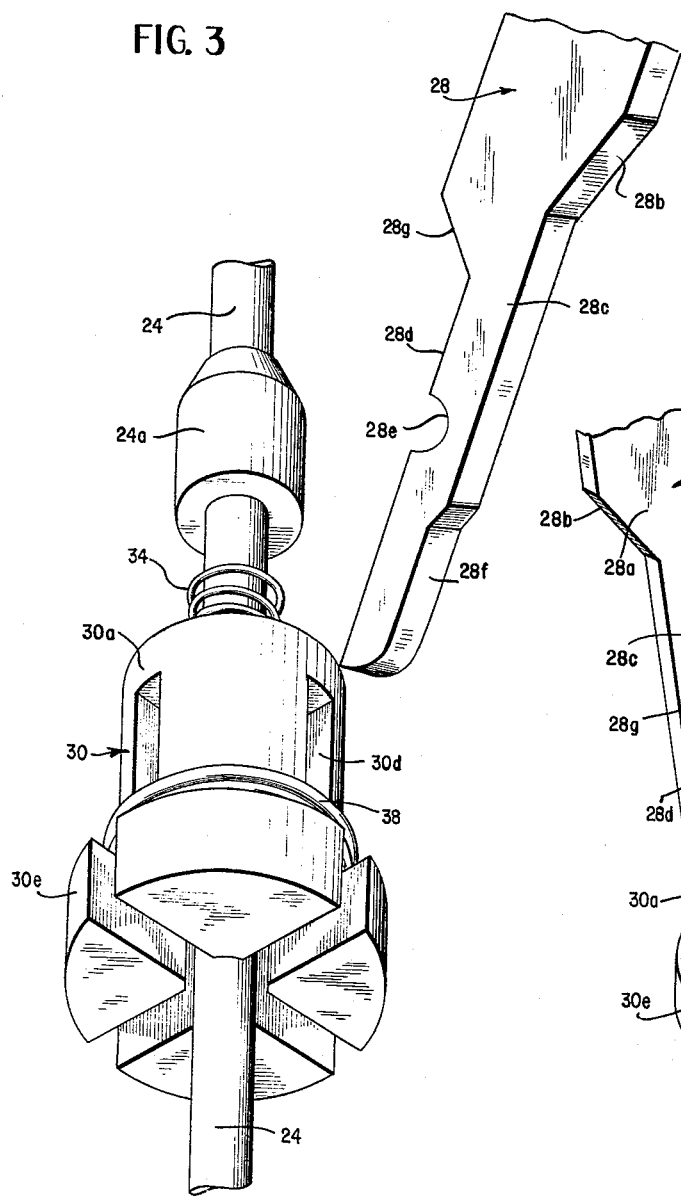
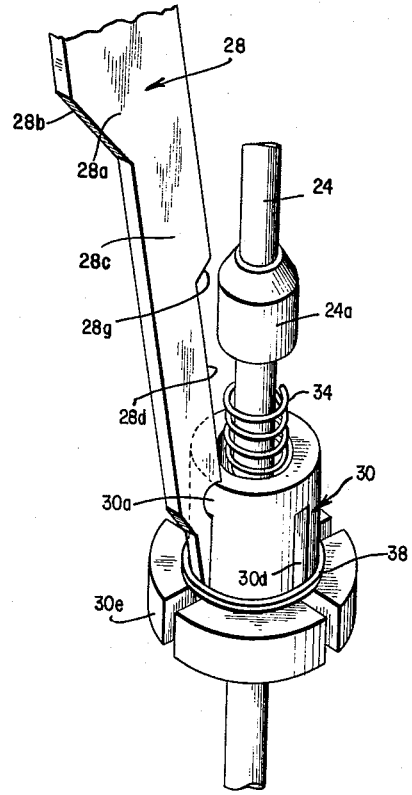
INVENTOR.
HANS CHRISTIAN HANSEN
BY *Dicke + Craig*
ATTORNEYS.

United States Patent Office 3,083,022
Patented Mar. 26, 1963

3,083,022
CENTER SPINDLES FOR MAGAZINE
PHONOGRAPHS
Hans Christian Hansen, Christianshoimsvej 14,
Copenhagen, Denmark
Filed Aug. 8, 1956, Ser. No. 602,884
Claims priority, application Great Britain Aug. 10, 1955
20 Claims. (Cl. 274—10)

The present invention relates to a center spindle for magazine phonographs and more particularly to a center spindle of the type having a retractable platform for supporting a stack of records on the spindle and means operative to retract said platform to relieve the lowermost record in the stack and simultaneously hold the remaining records on the spindle until the platform is brought into its supporting position again.

It is a purpose of the present invention to provide a centre spindle of the type referred to hereinabove which is simple in construction and reliable in operation.

A further purpose of the present invention is to provide a center spindle of the type referred to in which said retractable platform or primary support is of the umbrella-type and will provide a safe and relatively large supporting surface for the stack of records. The term "umbrella-type" shall be interpreted for purposes of the present invention as comprising a plurality of members such as blades or the like extending through slots in the side wall of the spindle capable of closing about an interior control member to be retracted into the spindle through said slots as well as to extend through said slots in an inclined direction like stretchers in an umbrella.

Figure 1:
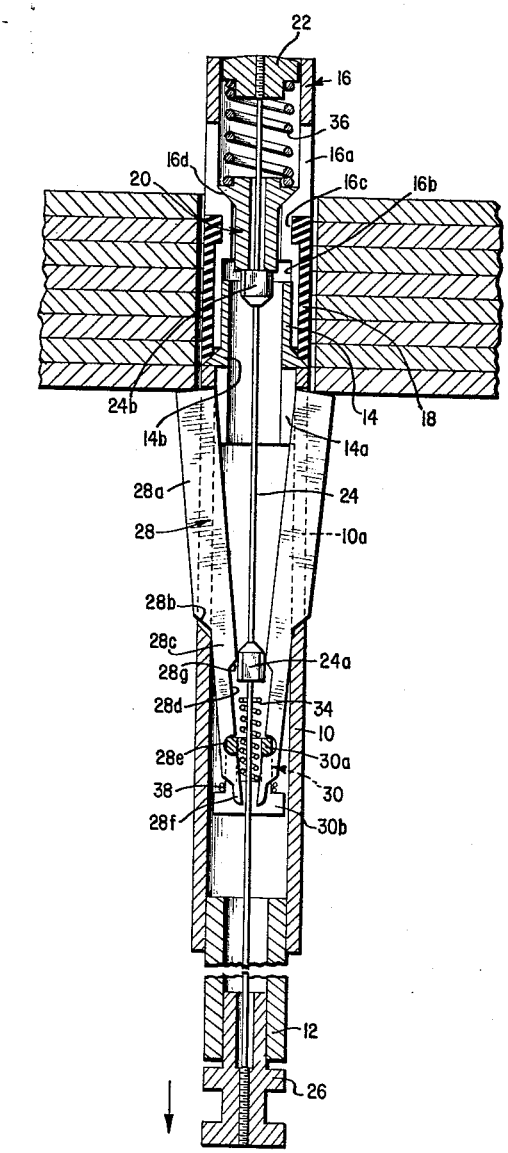
Figure 2:
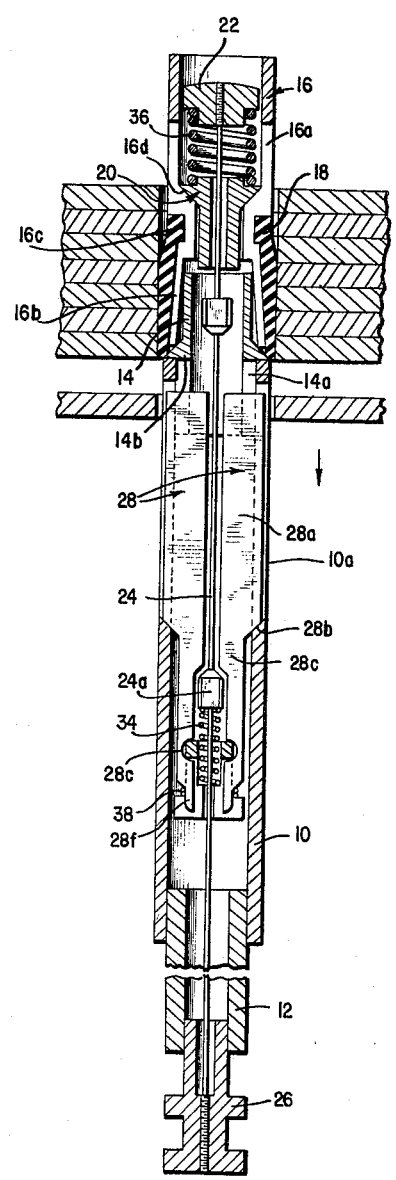

The present invention will now be further explained with reference to the drawing, in which FIGURE 1 is a longitudinal section through an embodiment of a center spindle according to the present invention with the primary support or platform in projecting position and the secondary supporting means or expandable members in retracted position, FIGURE 2 is a longitudinal section with the primary supporting platform retracted and the secondary holding means in projecting position, FIGURE 3 is a perspective view, on an enlarged scale, of the detail of the center spindle shown in FIGURES 1 and 2, and FIGURE 4 is another perspective view, on an enlarged scale, of the same detail.

The spindle is composed of the following parts:

The main part is a tubular member 10 (FIGURES 1 and 2) having along a part of its length a plurality of longitudinal slots 10a terminating slightly below the top of the tube 10. At the lower end of the tube 10 there is provided a tube 12 of reduced diameter fitting inside the tube 10 so that the lower end of the tube 10 forms an abutment against which the spindle is supported on the end of the turntable center bushing (not shown) through which the tube 12 extends.

On the top of the tube 10 there is secured another tubular member 14 of reduced diameter having a slotted portion 14a with slots corresponding to the slots 10a in the tube 10 and an inclined conical portion 14b that extends towards the top edge of the tube 10. The part 14 is held in position by the friction between its portion 14a and the interior of the tube 10.

On the outside of the tubular member 14 there is arranged another tubular member 16 having a slotted portion 16a with a plurality of longitudinal slots. The slotted portion is of reduced diameter along a part of its length at 16b and further has a recess at 16c as well as an interior inclined surface at 16d. The remaining part of the tubular member 16 has a diameter corresponding to the tube 10. The portion 16b of the tube 16 having reduced diameter is surrounded by an elastic sleeve 18 such as rubber, preferably synthetic rubber so as to stand up under tropical conditions.

In the interior of the tubular member 16 there is provided a bushing 20 having a conical portion adapted to cooperate with the conical surface 16d.

At the top end of the spindle there is provided a closure member 22 to which for example by means of screw threads is secured one end of an interior control rod 24 that extends down through a centre bore in the member 20 and further extends down through the entire spindle whereby the center rod 24 at the lower end thereof is provided with a recessed sleeve 26 secured to the lower end of the rod 24 and adapted to cooperate with the control mechanism of the phonograph (not shown) in order to pull the control rod downwardly.

A primary support is provided for holding the stack of records A in the form of prongs or a plurality of blades generally designated by reference numeral 28 (FIGURES 1–4) and extending radially through the slots 10a and adapted to open and close like the stretchers in an umbrella.

Each of these prongs is in the form of a thin plate having a main body portion 28a. As will be appreciated, my construction of the center spindle enables for the use of a very thin central control rod 24 which leaves a substantial annular space inside the tube 10 whereby it is possible to make the width of each of the members 28 relatively large, not substantially less than the radius of the spindle so that there will be a substantial supporting surface for the stack of records when the members 28 are in their outwardly extending, inclined position as shown in FIGURE 1.

At the lower end of the body portion 28a there is provided an exterior inclined surface 28b below which the member 28 has a portion 28c of reduced width which extends downward in the annular space inside the tube 10 below the lower edges of the slots 10a. Somewhere below the portion 28b the interior edge of the portion 28c is cut away at 28d (FIGURE 3) to provide passage and space for an abutment 24a which is rigidly secured to the control rod 24 and serves the purpose of controlling the retraction of the supporting prongs 28. Above the cut-away edge 28d an interior inclined edge portion 28g is provided.

The prongs 28 are further provided with notches 28e adapted to receive an annular portion 30a of a small bushing 30 the lower end of which has a plurality of slots 30d and which further is provided with a radially extending flange 30e. Below the notches 28e the prongs 28 are provided with further portions of reduced diameter by cutting away a part of the exterior edge at 28f.

The prongs 28 are mounted in the bushing 30 in a manner that is clearly illustrated in FIGURES 3 and 4 and held in position by means of a spring 38 that has a few turns and surrounds the bushing 30 above the flange 30e as well as the lower ends of the prongs where these have reduced width at 28f. The spring thereby provides a resilient member that will serve to spread the prongs by resiliently clamping the lower ends thereof so as to cause them to pivot about the bearing defined by the annular portion 30a of the bushing 30 and the notches 28e provided in prongs 28 and thereby spread the top ends of the prongs 28 into the position shown in FIGURE 1.

In the interior of the small bushing 30 there is provided a spring 34 extending down into a bore in the center of the bushing 30 and abutting against the bottom of said bore. The spring 34 terminates somewhere below the bottom of the member 24a when the parts are in the position shown in FIGURE 1.

Between the top end of the member 20 and the underside of the member 22 there is interposed another spring 36. The spring 36 is relatively strong compared with the spring 34. Finally there is rigidly secured to the rod 24 another abutment member 24b that in the position of the parts shown in FIGURE 1 abuts against the underside of the member 20. The position of the abutment 24b and the top closure member 22 is so adapted that the spring 36 is always somewhat tensioned.

The operation of the center spindle described hereinabove is substantially as follows:

In the position of rest the parts are in the mutual positions as shown in FIGURE 1. The control rod 24 is by means of the spring 36 pulled upwardly until the abutment 24b engages the underside of the member 20 and in this position the movement is stopped by engagement of the sleeve 26 against the lower end of the tubular member 12. The fingers of the slotted portion 16a of the member 16 are by means of their resiliency and by means of the elastic sleeve 16b retracted to engage the cylindrical part of the member 14.

The second abutment 24a on the control rod 24 stands opposite the lowest corner of the widest portion of the prongs 28 which are spread out by the action of the spring 38.

In operation the interior control rod 24 is pulled downwardly in direction of the arrow shown. Hereby initially the abutment 24b is relieved from the underside of the member 20 whereby the spring 36 is further tensioned. This will cause the force of the spring 36 to be transmitted through the member 20 to the expandable tubular member 16, which will be moved slightly in the downward direction with its lower end in engagement with the inclined surface 14b of the member 14, thereby causing the lower end of the member 16 to expand whereby also the resilient sleeve 18 will expand and be brought into engagement with the next lowermost record in the stack as well as with a plurality of the records thereinabove.

During this part of the operation the abutment 24a has not yet reached the top end of the spring 34. Only after the expandable sleeve 18 has been clamped safely against the edges of the interior holes in a plurality of the records, the abutment 24a will start to compress the spring 34. When this spring is compressed it will result in a downward movement of the small bushing 30 which will draw the prongs 28 downwardly since the annular portion 30a engages in the recesses 28e of the prongs 28. As a result thereof, the inclined surfaces 28b at the lower ends of the body portions 28a of the prongs will slide along the lower edges of the slot 10a in the tubular member 10 so as to tilt the prongs to close them about the centre rod 24 and thereby retract the prongs into the spindle.

When the control rod 24 is released after the lowest record has been dropped the action of the spring 36 as well as the elasticity of the fingers 16a and the sleeve 16b will cause the control rod 24 to be moved up toward its position of rest. During this upward movement the abutment 24a will engage the inclined surface portions 28g of the prongs 28 and will cause them to be raised, and simultaneously therewith the spring 38 will control also the outward spreading of the prongs 28 which will thereby return to the position thereof shown in FIGURE 1 with their inclined surfaces 28b sliding along the lower edges of the slots 10a.

It will be appreciated that due to the substantial width of the prongs or blades 28, the inclined surfaces 28b can also be made of a material such as nylon, while the supporting members can be made separately for example by being stamped out from a suitable material such as stainless steel or moulded, for example in nylon.

The independant arrangement of the bushing 30 also provides for a certain idle play of the movement of the interior control member 24 during which the secondary support can be operated to hold the next lowermost record and the remaining part of the stack safely before the primary support is actuated for the purpose of retracting the primary supporting members in the spindle.

It will be appreciated that the invention is not limited to the embodiment described hereinabove and shown in the drawing, but that various modifications of the arrangement are possible within the scope of the present invention.

Thus with respect to the elastic sleeve 18 it is possible to provide the latter with a portion of reduced wall thickness in the area of the third lowermost record in the stack so as to make sure that it will always expand in the area of the next lowermost record even if the record resting thereon might be one having a hole of less diameter than usual.

It will be appreciated that the invention also includes the possibility that the interior control member 24 may be a tubular member for example for the purpose of arranging therein a thin wire or rod capable of performing other functions, such as activating a mechanism to stop the phonograph after playing of the last record. In this event said interior tubular member may if necessary be provided with slots in alignment with the slots in the exterior tubular member in order to receive the supporting members when they are retracted in the spindle.

It will also be appreciated that instead of an expandable rubber member for use as a secondary support, an expandable sleeve of other material such as, for example, an expandable slotted steel sleeve may be used at the lower end of which slightly outwardly bent knife portions are provided to slide on the inclined surface 14b and thereby enter the space between the lowest and the next lowest record in the stack.

I claim:

1. A center spindle for a record changing phonograph comprising: an elongated tubular member having a plurality of longitudinal, peripherally aligning slots, an elongated control member coaxially arranged in said tubular member and movable in the longitudinal direction thereof, a plurality of primary supporting longitudinal members each having a body portion tiltable in said slots and a lower portion of reduced width having an inwardly directed notch and being tiltable in the interior of said tubular member below said slots, a bushing slidably arranged in the interior of said tubular member and having a bore for the passage of said elongated control member, said bushing having a plurality of slots each receiving the lower portion of one of said primary supporting members to stabilize the same against sideward movements during tilting thereof and a cylindrical portion engaging said notches in said lower ends thereof, a resilient member surrounding said bushing below said cylindrical portion for engaging said primary supporting members adjacent their lower ends, secondary supporting means in axially spaced relationship to the top ends of said primary supporting members, means operable to engage said secondary supporting means with at least the next lowermost record to hold the latter on the spindle when primary supporting members are retracted, resilient means operable to actuate said secondary supporting means to assume said record engaging position, a first abutment on said elongated control member operable to retain said secondary supporting means in the inoperative position thereof and a second abutment on said elongated control member in such an axially spaced relationship from said first abutment that said first abutment by axial movement of said elongated control member can be relieved entirely from its position to control said secondary supporting means before said second abutment enters into operative engagement with said slidable bushing to move the latter downwards to tilt said primary supporting members to retract them in the center spindle.

2. A record drop controlling center spindle for a record changing phonograph comprising: an exterior tubular member having a plurality of elongated axially extending slots, a plurality of elongated primary supporting members having body portions tiltably arranged in said slots in said tubular member between a retracted record drop position and a projecting record supporting position in which their top ends are spread out and having portions below said body portions which extend inside said tubular member below the region of said slots therein, a sleeve member in the interior of said tubular member arranged in the region of said lower portions of said supporting members, said sleeve member having a plurality of substantially radially extending slots in which said lower portions of said supporting members are received in guiding relationship to stabilize said supporting members against sideward movements during tilting thereof, an operative connection between said sleeve member and said supporting members operable to positively move said supporting members downwardly in response to downward movement of said sleeve member, and an interior control member operable to move said sleeve member down through said tubular member, each of said supporting members being provided at the lower end of the body portion thereof with an inclined external edge portion operable to engage the lower end of each of said slots to cause said member to be tilted to its retracted position in response to said downward movement of said sleeve member.

3. A record drop controlling center spindle for a record changing phonograph comprising: an exterior tubular member having a plurality of elongated axially extending slots having their lower ends in the same plane perpendicular to the axis of said tubular member, a plurality of elongated primary supporting members having body portions tiltably arranged in said slots between a retracted record drop position and a projecting record supporting position in which their top ends are spread out, said primary supporting members including portions below said body portions which extend inside said tubular member below the region of said slots therein, a sleeve member in the interior of said tubular member arranged within the region of said lower portions of said supporting members, said lower portions of said supporting members having interior notches and said sleeve member having an annular portion engaging into said notches and operable to cause positive longitudinal displacement of said supporting members in response to longitudinal displacement of said sleeve member, said sleeve member further having radial slots receiving a part of the lower ends of said supporting members to enable tilting thereof about said annular portion while stabilizing said supporting members against sideward movement during such tilting, the lower end of said sleeve member being surrounded by a spring in engagement with the exterior of said supporting members and operable to tilt the same to assume their record supporting position, and an interior control member operable to move said sleeve member down through said tubular member, each of said supporting members being provided at the lower end of the body portion thereof with an inclined external edge portion operable to engage the lower end of each of said slots to cause said member to be tilted to the retracted position thereof in response to said downward movement of said sleeve member.

4. A record drop controlling center spindle for a record changing phonograph comprising: an exterior tubular member having a plurality of elongated axially extending slots with the lower ends thereof in the same plane perpendicular to the axis of said tubular member, a plurality of elongated primary supporting members having body portions tiltably arranged within said slots in said tubular member between a retracted record drop position and a projecting record supporting position in which their top ends are spread out, said primary supporting members including also portions below said body portions which extend inside said tubular member below the region of said slots provided therein, a sleeve member slidably arranged within the region of said lower portions of said supporting members in the interior of said tubular member, said sleeve member having a top portion of reduced diameter, a lower radially extending flange portion and a plurality of radial slots extending through the lower part of said sleeve member thereby leaving an upper annular unslotted portion thereof, the lower portions of said supporting members having interior notches adapted to engage with said annular portion of said sleeve member and extending into said radial slots thereof to be stabilized thereby against sideward movement while enabling tilting movements, a spring surrounding said sleeve member and engaging the lower ends of said supporting members to cause the same to tilt about said annular portion and thereby to assume their record supporting position, and an interior control member operable to move said sleeve member down through said tubular member, each of said supporting members being provided with an inclined external edge portion at the lower end of the body portion thereof operable to engage the lower end of each of said slots to thereby cause said supporting members to be tilted to its retracted position in response to said downward movement of said sleeve member.

5. A record drop controlling center spindle for record changing phonographs comprising: an exterior hollow tubular member having a plurality of elongated axially extending slots the lower ends of which terminate in the same plane perpendicular to the axis of said tubular member, a plurality of elongated record supporting members each of which has a body portion arranged to tilt in one of said slots between an inclined position projecting outside the periphery of said tubular member to define a record supporting surface at the top of said supporting members and a retracted record drop position substantially parallel with the axis of said tubular member, each of said supporting members further having a lower portion of reduced cross section extending into the interior of said tubular member below the lower edges of said slots provided therein, each of said supporting members also having an exterior inclined surface portion below the body portion thereof operable to engage the lower edge of said slot to cause said supporting member to be tilted from said record supporting position to said record drop position by a downward pull in said supporting members, said lower portion of each of said supporting members having an interior notch, a sleeve member slidably arranged in the interior of said tubular member and having portions extending into said interior notches of said supporting members and further having radial slots receiving a part of said lower ends of said supporting members to stabilize said supporting members against sideward movements during tilting thereof, elastic means operable to bias said supporting members to be tilted to assume their inclined record supporting position, an elongated control member extending substantially concentrically through said tubular member and having an abutment operable to move said sleeve member downwardly through said tubular member, an elastic member operable to retain said elongated control member in a position in which said abutment is inoperative to move said sleeve member downwardly and in which said abutment is substantially in a position outside a part of the lower ends of the body portion of said supporting members, the lower ends thereof having their reduced cross section so adapted relatively to the dimension of said abutment to provide space for the passage thereof when said abutment is moved downwardly and said supporting members are tilted to their record drop position.

6. A record drop controlling center spindle for record changing phonographs comprising: an exterior hollow tubular member having a plurality of elongated axially extending slots the lower ends of which terminate in the same plane perpendicular to the axis of said tubular member, a plurality of elongated primary record supporting members each of which has a body portion having an inclined exterior surface portion at its lower end operable to engage the lower edge of said slot and arranged to tilt in one of said slots between an inclined position with its top end projecting outside the periphery of said tubular member to define a record supporting surface and a retracted record drop position substantially parallel with the axis of said tubular member, each of said supporting members further having a lower portion of reduced width which extends into the interior of said tubular member below the lower edges of said slots provided therein, a sleeve member slidably arranged in the interior of said tubular member, means operable to cause said primary supporting members to slide axially with said sleeve member to thereby produce tilting movement of said supporting members while simultaneously therewith stabilizing the same substantially against sideward movement, secondary supporting means operable to engage and hold at least the second lowermost record of a stack supported on said primary supporting members and including a structure having a plurality of fingers movable between an expanded record holding position and a retracted inoperative position, each of said fingers having an inclined interior surface portion, a cam member slidably arranged and operable to engage said inclined surface portions to cause said fingers to assume their expanded record holding positions, an elongated interior control member arranged for longitudinal movement in said exterior tubular member and having a first control abutment for said secondary supporting means operable to retain said cam member in the inoperative position thereof, said elongated member further having a second control abutment operable to engage said slidable sleeve member to move the same downwardly, a spring operatively connecting said elongated control member with said cam member and operative to retain said elongated control member in a position with said first control abutment in its position holding said secondary supporting means in the inoperative position thereof and with said second control abutment for said primary supporting structure disengaged from said sleeve member, said spring further being operative to control the movement of said cam member for said secondary supporting structure to expand said fingers thereof when said elongated control member is pulled downwardly to disengage said first control abutment in a position before said second control abutment is rendered operative to engage said sleeve member.

7. In a record changing and supporting spindle in combination: an elongated tubular member of circular exterior cross section having a plurality of axially extending slots the lower ends of which terminate in the same plane perpendicular to the axis of said tubular member, primary record support and release means including a plurality of elongated members disposed in said tubular member, each of said primary members having a portion at the lower end of which an inclined surface is provided, said portion being movable radially in opposite directions in each of said slots between a projecting position for record support and a retracted position for record release, respectively, said members further being movable axially to said tubular member for causing retraction to record release position by engagement between said inclined surfaces and the lower edges of said slots, a secondary supporting structure arranged above said primary supporting members, an elongated control member arranged for axial movement within said spindle structure and having a cone structure resiliently held against said secondary supporting structure, a first abutment operable to retain said cone structure in a position to render said secondary supporting structure inoperative and a second abutment operable to control axial movement of said primary supporting members, and a supporting sleeve structure arranged for sliding movement and provided with stabilizing slot means in operative connection with the lower ends of said primary supporting members to retain said supporting members in mutual position and to positively transmit the movement of said second abutment to said primary supporting members to cause their retraction in timed relationship with the movement of said first abutment after the latter has been disengaged from said cone member to cause said resilient means to press said cone structure to actuate said secondary supporting means.

8. In a record changing and supporting spindle in combination: an elongated tubular cylindrical member having a plurality of axially extending slots the lower ends of which terminate in the same plane perpendicular to its axis, an elongated primary record support and release member disposed in each of said slots and each having a body portion at the lower end of which an inclined surface is provided as well as a lower portion thereof extending into said tubular member below the region of said slots, said body portion being movable radially in opposite directions in said slot between a projecting position for record support and a retracted position for record release, respectively, said support members further being movable axially in said tubular member for causing retraction to record release position by engagement between said inclined surfaces and the lower edges of said slots, a secondary supporting structure arranged above said primary supporting members, an elongated control member arranged for axial movement within said tubular member, spring means between said elongated control member and said secondary supporting structure operable to render said secondary supporting structure operative to engage at least the next lowermost record of a stack supported on said primary members, said elongated control member having first means operable to render said spring means inoperative and second means operable to control axial movement of said primary supporting members, and a supporting sleeve structure arranged for sliding movement and provided with stabilizing slot means in operative connection with said lower portions of said primary supporting members to retain said supporting members in mutual position and to positively transmit the movement of said second means of said elongated control member to said primary supporting members to cause their retraction in timed relationship with the movement of said first means after the latter has rendered said spring means operative to actuate said secondary supporting means.

9. A phonograph of the type having a center spindle for supporting a stack of records comprising primary supporting means operable to be retracted into said spindle for releasing the lowest record of a stack supported on the spindle, and secondary supporting means for temporarily supporting the next-lowest record while said lowest record is released by said primary supporting means, said secondary supporting means including a plurality of leaf springs to be spread outwardly, and elastic clamping means disposed radially outside of said leaf springs and controlled by outward spreading of said leaf springs for engaging the center hole of said next-lowest record, and actuating means for both said primary and secondary supporting means including a reciprocable member in the interior of said spindle and operative to cause clamping of said elastic means in the center hole of said next-lowest record of a stack supported on said primary supporting means by reciprocating movement of said reciprocable member and therewith by spreading outwardly of said leaf springs.

10. A phonograph as claimed in claim 9, in which said elastic means extends axially along said spindle through the center hole of a plurality of records.

11. A phonograph as claimed in claim 9, wherein said elastic means is in the form of a sleeve of rubber surrounding a part of the top portion of the spindle over a length thereof.

12. A phonograph as claimed in claim 9, wherein said leaf springs are part of a slotted sleeve member.

13. A phonograph as claimed in claim 9, wherein said reciprocating member includes a cam surface in the form of a cone surface for spreading said leaf springs.

14. A phonograph as claimed in claim 13, in which said cone surface is relatively stationary and said leaf springs are mounted for reciprocation in the downward direction thereof.

15. In a phonograph of the type having a center spindle for supporting thereon a stack of records to be released one by one to the turntable, comprising a cylindrical tube having a plurality of slots, a plurality of prongs tiltable in said slots between an exterior operative inclined position defining a support for a stack of records on their top ends and a retracted inoperative position within the confines of the spindle, a bushing mounted for reciprocation with said tube and provided with stabilizing slots to receive therein the lower ends of said prongs and stabilize the same against sideward movement, said prongs being at their lower ends operatively connected with said bushing for common movement therewith, spring means operatively connected with said bushing and in engagement with the lower ends of the prongs below their pivot points to seek normally to move said prongs into the said operative position thereof, and a reciprocable control member mounted within said tube to cause axial displacement of said bushing for thereby controlling tilting of said prongs from their operative to their inoperative position.

16. In a phonograph, the combination according to claim 15, wherein said spring means elastically surrounds the lower ends of said prongs and thereby retains the same within said slots.

17. A phonograph of the type having a center spindle provided with slots for supporting thereon a stack of records to be released one by one to the turntable comprising: secondary supporting means operable to effectively support the next lowest record of a stack supporting on said spindle, primary supporting means including a plurality of prongs tiltable in the said slots in said center spindle between an exterior operative position defining a support for a stack of records on the top ends of said prongs and a retracted inoperative position within said spindle, reciprocable controlling means inside said spindle, first means operatively connecting said control means and said secondary supporting means and second means operatively connecting said control means and said prongs for alternatively rendering said secondary supporting means effective to support the next lowest record of a stack while said prongs are retracted or to support the stack of records by said prongs in the exterior operative position thereof while said secondary supporting means is rendered ineffective, said second connecting means including a reciprocable bushing having a plurality of substantially radial slots receiving the lower ends of said prongs to stabilize the same against sideward movements during tilting movements thereof.

18. A phonograph of the type having a center spindle provided with slots for supporting thereon a stack of records to be released one by one to the turntable comprising: secondary supporting means operable to effectively support the next lowest record of a stack supporting on said spindle, primary supporting means including a plurality of prongs tiltable in the said slots in said center spindle between an exterior operative position defining a support for a stack of records on the top ends of said prongs and a retracted inoperative position within said spindle, reciprocable controlling means inside said spindle, first means operatively connecting said control means and said secondary supporting means and second means operatively connecting said control means and said prongs for alternatively rendering said secondary supporting means effective to support the next lowest record of a stack while said prongs are retracted or to support the remaining stack of records by said prongs in the exterior operative position thereof while said secondary supporting means is rendered ineffective, said second connecting means including stabilizing means having a plurality of substantially radial slots receiving the lower ends of said prongs to stabilize the same against sideward movements during tilting movements thereof.

19. A phonograph of the type having a center spindle provided with slots for supporting thereon a stack of records to be released one by one to the turntable comprising: secondary supporting means operable to effectively support the next lowest record of a stack supporting on said spindle, primary supporting means including a plurality of prongs tiltable in the said slots in said center spindle between an exterior operative position defining a support for a stack of records on the top ends of said prongs and a retracted inoperative position within said spindle, reciprocable controlling means inside said spindle, first means operatively connecting said control means and said secondary supporting means and second means operatively connecting said control means and said prongs for alternatively rendering said secondary supporting means effective to support the next lowest record of a stack while said prongs are retracted or to support the remaining stack of records by said prongs in the exterior operative position thereof while said secondary supporting means is rendered ineffective, said second connecting means including a reciprocable bushing having a plurality of substantially radial slots receiving the lower ends of said prongs to stabilize the same against sideward movements during tilting movements thereof, and a coil spring operatively associated with the said lower ends of said prongs and operable to normally seek to spread out said prongs.

20. A phonograph of the type having a center spindle provided with slots for supporting thereon a stack of records to be released one by one to the turntable comprising: secondary supporting means operable to effectively support the next lowest record of a stack supporting on said spindle, primary supporting means including a plurality of prongs tiltable in the said slots in said center spindle between an exterior operative position defining a support for a stack of records on the top ends of said prongs and a retracted inoperative position within said spindle, reciprocable controlling means inside said spindle, first means operatively connecting said control means and said secondary supporting means and second means operatively connecting said control means and said prongs for alternatively rendering said secondary supporting means effective to support the next lowest record of a stack while said prongs are retracted or to support the remaining stack of records by said prongs in the exterior operative position thereof while said secondary supporting means is rendered ineffective, said second connecting means including stabilizing means having a plurality of substantially radial slots receiving the lower ends of said prongs to stabilize the same against sideward movements during tilting movements thereof, and resilient means cooperating with said lower ends and operable to normally spread out said prongs.

References Cited in the file of this patent

UNITED STATES PATENTS

| | | |
|---|---|---|
| 2,579,175 | Dale | Dec. 18, 1951 |
| 2,615,720 | Miller | Oct. 28, 1952 |
| 2,616,705 | Leonard | Nov. 4, 1952 |
| 2,617,655 | Leonard | Nov. 11, 1952 |
| 2,689,735 | Morrison | Sept. 21, 1954 |

FOREIGN PATENTS

| | | |
|---|---|---|
| 822,026 | France | Sept. 6, 1937 |
| 62,822 | Denmark | Oct. 23, 1944 |
| 632,956 | Great Britain | Dec. 5, 1949 |
| 637,921 | Great Britain | May 31, 1950 |